W. H. POWELL.
DYNAMO ELECTRIC MACHINE.
APPLICATION FILED APR. 1, 1907.
1,051,821.
Patented Jan. 28, 1913.
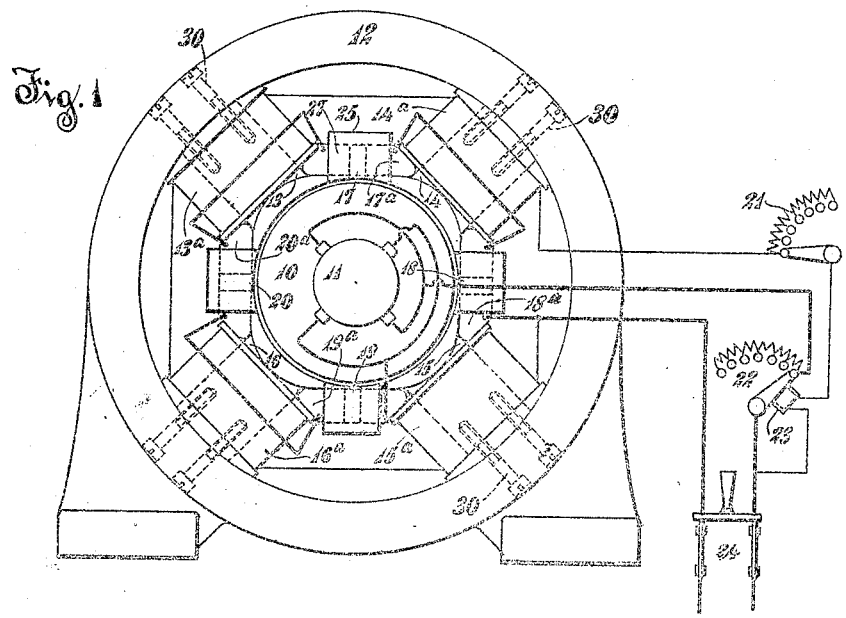

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

1,051,831.

Specification of Letters Patent. Patented Jan. 28, 1913.

Application filed April 1, 1907. Serial No. 365,674.

*To all whom it may concern:*

Be it known that I, WILLIAM H. POWELL, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and especially to means for improving the commutation in commutator motors.

It has become common in building dynamo-electric machines having commutators to provide auxiliary or commutating poles which alternate in position with the main poles and serve to prevent sparking at the commutator. In most of these arrangements, however, the commutating pole-pieces have been magnetically continuous with the main field yoke of the machine. This use of a common yoke for the main field pole-pieces and the commutating pole-pieces has been found to have certain disadvantages, such as requiring a greater number of ampere turns in the commutating winding in order to produce a desired effect and, in variable speed motors in which field control is used, a variation in the relation between the current in the commutating winding and the magnetization resulting therefrom when the strength of the main field is varied. These disadvantages may be partly or wholly overcome by making the commutating poles magnetically independent of the main field yoke. This is the basis of my invention.

The various novel features of my invention will appear from the description and drawings and will be particularly pointed out in the claims.

Figure 1 is an end view of a variable speed motor embodying my invention, the connections being shown somewhat diagrammatically; Fig. 2 is a partial section on the line 2—2 of Fig. 3, showing one of the commutating pole-pieces of Fig. 1 with portions of the adjacent parts; and Fig. 3 is a section on the line 3—3 of Fig. 2.

The variable speed motor here shown comprises an armature 10 provided with a commutator 11, main field pole-pieces 13, 14, 15 and 16 attached to a main field frame or yoke 12, and auxiliary or commutating pole-pieces 17, 18, 19 and 20 magnetically discontinuous from said main field yoke. The commutating pole-pieces are preferably in the same plane transverse to the axis of the armature as the main field pole-pieces, with which they alternate in position, each commutating pole-piece being substantially midway between two adjacent main pole-pieces. The main field coils 13ᵃ, 14ᵃ, 15ᵃ and 16ᵃ of the respective main field pole-pieces are shown connected in series with each other and in shunt to the armature, and are adjustable in strength by a field rheostat 21 to control the motor speed. The coils 17ᵃ, 18ᵃ, 19ᵃ and 20ᵃ of the respective commutating pole-pieces are shown connected in series with each other and with the armature 10. The voltage impressed on these commutating windings and the armature is controlled by a starting box 22, the retaining magnet 23 of which is here shown as connected in the shunt field circuit. Current may be supplied from any suitable source through a switch 24.

The commutating pole-pieces 17, 18, 19 and 20 are each integral with or attached to a bar 25 of magnetic material which extends longitudinally of the armature and has its ends 26 and 27 bent inward around the ends of the commutating coil into proximity to the ends of the armature 10 to serve as auxiliary pole-pieces of opposite polarity to their respective associated commutating pole-pieces.

The magnetic fields between the commutating pole-pieces and the periphery of the armature serve to prevent sparking at the commutator in the well known manner.

The magnetic fields in the air gaps between the ends of the armature and the auxiliary pole-pieces 26 and 27 are cut by the end conductors of the armature winding, but because of the angular displacement of these conductors relative to the embedded armature conductors, the conductors which travel through these fields do not form parts of the coils undergoing commutation, the conductors of which are under the commutating poles. These air gaps between the ends 26 and 27 and the ends of the armature core should be made comparatively small to increase the efficacy of the commutating winding. By thus making the commutating pole-pieces magnetically discontinuous from the main field poles and their yoke the disadvantages referred to at the beginning of this specification are partly or wholly avoided.

The commutating coils and pole-pieces may be supported from the main yoke by any suitable non-magnetic connection. Preferably the commutating coils are held in place by being clamped between the pole shoes and coils of the adjacent field pole-pieces, as best shown in Fig. 2, the commutating coils being made of the proper shape to fit into the openings between the main pole shoes and their associated field coils. This clamping may be effected by screws 30. The commutating pole-pieces are then supported by the commutating coils.

While I have particularly described my invention as applied to direct current motors it is not limited to such use, but is equally applicable to any dynamo-electric machine having a commutator, whether generator or motor, direct or alternating current.

Many modifications in the precise arrangements here shown and described may be made without departing from the spirit and scope of my invention and all such I aim to cover in the following claims.

What I claim as new is:—

1. In a dynamo-electric machine, the combination of main field pole-pieces having pole shoes, windings for said pole-pieces, and commutating windings solely supported between adjacent main field pole-pieces by being clamped between the pole shoes and windings of the latter.

2. In a dynamo-electric machine, the combination of main field pole-pieces having pole shoes, windings for said pole-pieces, commutating windings solely supported between adjacent main field pole-pieces by being clamped between the pole shoes and windings of the latter, and cores for said commutating windings.

3. In a dynamo-electric machine, the combination of main field pole-pieces having pole shoes, windings for said pole-pieces, auxiliary windings supported between adjacent pole-pieces by being clamped between the pole shoes and windings of the latter, and cores within said windings and supported thereby.

4. In a dynamo-electric machine, the combination of a plurality of main field pole-pieces, a yoke therefor, a plurality of commutating pole-pieces, and a plurality of auxiliary pole-pieces out of the plane of the main pole-pieces the commutating pole-pieces being magnetically connected to only auxiliary pole-pieces.

5. In a dynamo-electric machine, the combination of field pole-pieces distributed around the armature, a yoke to which said poles are attached, commutating pole-pieces each in a plane with the main pole-pieces, and auxiliary pole-pieces out of the plane of the main pole-piece and each associated with one of the commutating pole-pieces.

6. In a dynamo-electric machine, the combination of field pole-pieces distributed around the armature, a yoke to which said pole-pieces are attached, commutating pole-pieces each in a plane with the main pole-pieces, and auxiliary pole-pieces out of the plane of the main pole-pieces, each commutating pole-piece being magnetically associated with a plurality of auxiliary pole-pieces.

7. In a dynamo-electric machine, the combination of an armature having end-turns, a commutator, a plurality of main field pole-pieces, a yoke therefor, a commutating pole-piece in the plane of the main pole-pieces, and an auxiliary pole piece magnetically connected to the commutating pole piece and in the plane of the end turns at one end of the armature winding.

8. In a dynamo-electric machine, the combination of an armature having end-turns, a commutator, a plurality of main pole-pieces, a yoke connecting them, a plurality of commutating pole-pieces in the plane of the main pole-pieces, coils on said commutating pole-pieces; and a plurality of auxiliary pole-pieces magnetically continuous with the individual commutating pole-pieces and located in proximity to the end turns of the armature winding, the commutating pole-pieces being each independent of all the main pole-pieces and of all other commutating pole-pieces.

9. In a dynamo-electric machine, the combination of an armature having end turns, a commutator, main pole-pieces, coils thereon, a yoke connecting said main pole-pieces, commutating pole-pieces each magnetically independent of all the main pole-pieces and of all other commutating pole-pieces, coils on said commutating pole-pieces, and auxiliary pole-pieces arranged in the planes of the end turns at the two ends of the armature winding, one auxiliary pole-piece in each of said two planes being magnetically connected with each commutating pole-piece.

In testimony whereof I affix my signature, in the presence of two witnesses.

WILLIAM H. POWELL.

Witnesses:
GEO. B. SCHLEY,
FRED J. KINSEY.